(12) United States Patent
Parent et al.

(10) Patent No.: US 12,177,577 B2
(45) Date of Patent: Dec. 24, 2024

(54) ADAPTIVE RELATIVE ILLUMINATION OPTICAL SYSTEM

(71) Applicant: ImmerVision, Inc., Montreal (CA)

(72) Inventors: Jocelyn Parent, Lavaltrie (CA); Patrice Roulet, Montreal (CA); Simon Thibault, Quebec City (CA); Pierre Konen, Saint-Bruno (CA); Zhenfeng Zhuang, Montreal (CA); Julie Buquet, Montreal (CA); Valentin Bataille, Montreal (CA); Manuel Magini, Montreal (CA); Zhiqiang Miao, Brossard (CA)

(73) Assignee: IMMERVISION, INC., Montreal (CA)

( * ) Notice: Subject to any disclaimer, the term of this patent is extended or adjusted under 35 U.S.C. 154(b) by 302 days.

(21) Appl. No.: 17/720,498

(22) Filed: Apr. 14, 2022

(65) Prior Publication Data

US 2022/0337737 A1    Oct. 20, 2022

Related U.S. Application Data

(60) Provisional application No. 63/174,790, filed on Apr. 14, 2021.

(51) Int. Cl.
*H04N 5/335* (2011.01)
*G02F 1/15* (2019.01)
(Continued)

(52) U.S. Cl.
CPC ............ *H04N 23/741* (2023.01); *G02F 1/15* (2013.01); *H04N 23/55* (2023.01)

(58) Field of Classification Search
CPC .................................................. H04N 23/741
See application file for complete search history.

(56) References Cited

U.S. PATENT DOCUMENTS 11,137,660 B2 * 10/2021 Ikeda ..................... G03B 11/00
2013/0002928 A1    1/2013 Imai
(Continued)

FOREIGN PATENT DOCUMENTS

JP        2012005051 A        1/2012

OTHER PUBLICATIONS

Int'l Search Report and Written Opinion issued Aug. 9, 2022 in Int'l Application No. PCT/IB2022/053534.

*Primary Examiner* — Gary C Vieaux
(74) *Attorney, Agent, or Firm* — Panitch Schwarze Belisrio & Nadel LLP (57) ABSTRACT

A method for controlling an optical system including at least one active light-controlling element to better control the illumination of a scene when imaged on an image sensor is presented. This active light-controlling element is used to control the amount of light in an image zone depending on an electric signal from a controller. This allows imaging scenes with bright objects without over-exposure or scenes with dark objects without under-exposure on the image sensor. After image processing to reverse the effect of the active light-controlling element, the resulting processed images have an enhanced depth without the drawbacks associated to traditional HDR imaging. The method can use any shape of sub-elements in the active light-controlling element depending on the application. The method can also be used with multiple active light-controlling surfaces to further control the light on the image sensor, including separating the colors in the image.

20 Claims, 8 Drawing Sheets

(51) Int. Cl.
*H04N 23/55* (2023.01)
*H04N 23/741* (2023.01)

(56) References Cited

U.S. PATENT DOCUMENTS

| | | |
|---|---|---|
| 2019/0094658 A1 | 3/2019 | Rush et al. |
| 2019/0164251 A1* | 5/2019 | Rush ................ H04N 25/46 |
| 2020/0084398 A1 | 3/2020 | Feder et al. |

* cited by examiner

ADAPTIVE RELATIVE ILLUMINATION OPTICAL SYSTEM

CROSS-REFERENCE TO RELATED APPLICATIONS

The present application claims the benefit of U.S. Provisional Patent Application No. 63/174,790, filed on Apr. 14, 2021, entitled "Adaptive Relative Illumination Optical System," the entire contents of which are incorporated by reference herein.

BACKGROUND OF THE INVENTION

Embodiments of the present invention relate to the field of optical lenses and their design and, more particularly, to an optical system using a hardware optical element to adjust the light level in at least one zone of the image to avoid over and under exposure.

When the light level of a scene to be imaged has a high difference of light level, whether the optical system amplifies or not this high difference of light level in the scene on the image because of its low relative illumination, the resulting digital image files from an image sensor risk being under-exposed or over-exposed in parts of the images, limiting the number of details in the images.

One of the most common ways to avoid this issue is the use of traditional high-dynamic range (HDR) photography in which multiple images with different light levels are captured and then recombined in parts in order to create processed images having more depth that any of the individual images. However, traditional HDR works badly when the object is in movement since the multiples images to recombine have other differences than the light level and further processing artifacts can appear. Also, in order to capture multiple images with different exposures, the camera has to either adjust the exposure time, the sensor gain or the aperture size, all three having impact on the multiple captured images. When the exposure time is adjusted, the impact of moving objects in the scene via motion blur is increasingly visible with longer exposure time, affecting the reconstruction. When the sensor gain is adjusted, the multiple images have different levels of noise which creates artifacts during processing. When the aperture size is adjusted, the multiple images have different image quality and depth of focus, also making the processing into a single image more complicated. Furthermore, the larger the difference is between the brighter and the darker objects with objects having different levels of light in-between, the more of these multiple images are required, making it even more impractical with a dynamic scene. Finally, this traditional HDR technique requiring multiple images cannot be used in video mode without affecting the frame rate.

One alternative to traditional HDR imaging is some HDR image sensors allowing HDR imaging with a single exposure. However, when this is done by non-linearly compressing the dynamic range in a smaller dynamic range, image artifacts are produced when the image is processed to get back the real dynamic range. When this is done with image sensors having different kinds of pixel having different exposure time, a loss of detail is resulting compared to the cases where all pixels from the image sensor are used for each captured image. Finally, these techniques using a modified image sensor for HDR have a limited depth and are not efficient when the brightness difference in the scene is too big.

Photochromic glass, also known as smart glass or dynamic glass, is one way to control the amount of light through an optical surface, changing the transmission and reflection percentage of incoming rays of light depending on an applied voltage on its electrodes. These photochromic glasses are often used for large windows in which a precise control of the light transmission is required. However, their use inside complex optical imaging or projection systems has been limited to functions such as an aperture stop or for confidentiality reasons and have never been used to assist imaging a scene with a high brightness difference.

There has therefore been a long felt need for an optical system using an active light-controlling element to control the amount of light in at least one zone of the image sensor in order to improve the dynamic range in single-capture photography.

BRIEF SUMMARY OF THE INVENTION

Embodiments of the present invention overcome the previously mentioned issues with a method for cameras having an optical system including an active light-controlling element. When the camera is used to image a scene having a high difference of brightness on objects in the scene, for example when an object is directly in the light or in the shadow of another object, the resulting images have zones which are either over-exposed or under-exposed. The active light-controlling element generally includes multiple sub-elements allowing to adjust the light level in sub-zones of the image that reach the image sensor of the camera. The brighter zones of the scene have more light filtered by their sub-elements and the darker zones of the scene have less or no light filtered by their sub-elements, allowing the camera to output a digital image file with less difference of brightness than with a traditional camera.

The at least one optical system of the camera can include any number and type of optical element, including refractive elements, reflective elements, diffractive elements, elements with meta-surfaces, active optical elements or any other optical element able to change the direction of rays of light in order to help form an image in the image plane of the optical system. In the optical system, there are generally regions far from the aperture stop where the rays of light from different fields of the scene are well separated. These regions are well suited for placing the active light-controlling element having multiple sub-elements because it allows them to work individually on different zones of the field of view. In other applications, the active light-controlling element can also be located closer to the aperture stop of the system in order to control larger zones of the field of view at the same time. The active light-controlling element can include any number of sub-elements, arranged in any shape. The sub-elements are made of any material able to control the amount of light in a part of the optical system, including electro-chromic windows, liquid crystals, neutral density filters, plasmonic transparent conductive oxide nanocrystals or other types of nanocrystals or the like. The methods also work with any kind of light, polarized or unpolarized, in the visible or in other parts of the electromagnetic spectrum including, but not limited to, the UV or the IR spectrum.

The light transmission level of each sub-element of the active light-controlling element is controlled via a hardware controller. The controller can vary the state of each-sub element by applying an electric voltage on the electrodes of the elements, by sending an electric signal to the sub-elements or by any other way to change the light level. In some embodiments, the camera can automatically adjust the settings of the active light-controlling element via a feedback loop, running either in closed or open state. This feedback loop often uses the output image from the image sensor at a previous time to adjust the light level of at least one sub-element based on analysis from the processor.

Depending on the application, the output digital image file from the image sensor can be processed to remove the zones of controlled light and create a final output having a higher depth. This is especially required when the final image is supposed to be shown to a human observer since it helps create more pleasant images. On the other hand, in case of automatic analysis by computer algorithms, this extra processing step can sometimes be omitted.

The optical system can also include multiples active light-controlling elements or surfaces, each having a different kind of control over the optical image created by the optical system on its image plane. One example of such use is when different surfaces are used to filter or transmit different parts of the light spectrum, for example the red, green or blue part of the spectrum, by using specifically dyed active light-controlling elements.

BRIEF DESCRIPTION OF THE DRAWINGS

The foregoing summary, as well as the following detailed description of a preferred embodiment of the invention, will be better understood when read in conjunction with the appended drawings. For illustration purposes, the drawings show an embodiment which is presently preferred. It should be understood, however, that the invention is not limited to the precise arrangements and instrumentalities shown.

In the drawings.

DETAILED DESCRIPTION OF THE INVENTION

The words "a" and "an", as used in the claims and in the corresponding portions of the specification, mean "at least one."

Figure 1:
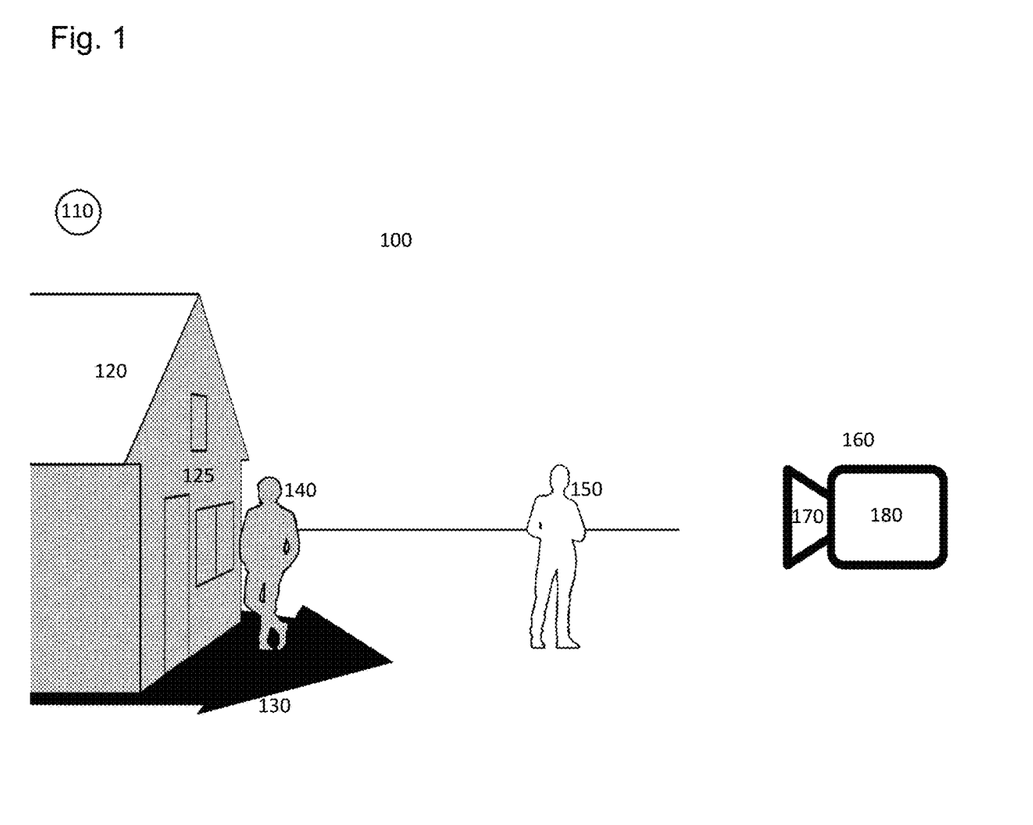
FIG. 1 shows an example scene with high difference of brightness imaged by a camera having an active light-controlling element.

FIG. 1 shows an example scene 100 with high difference of brightness imaged by a camera 160 having an active light-controlling element. Because of the presence of a strong light source, here illustrated for example as the Sun 110, there is a high difference of brightness on objects in the scene depending on if this object is directly illuminated by the light source or in the shadow of another object. In this example schematic, the roof 120 of the house and the person 150 are well illuminated by the light source and have a high brightness when imaged by the camera 160. In this example, the house also creates some shadow 130 and the person 140 standing in the shadow 130 is darker. Also, the side of the house 125 is not directly illuminated by the Sun 110 and is also darker. The person 140 and the side of the house 125 have a low brightness when imaged by the camera 160. The camera 160 includes an optical system 170 having at least one active light-controlling element as will be explained in FIG. 2 and an electronic part 180 including at least an image sensor and a processor to control the active light-controlling element. The camera 160 can optionally output original or processed images either via a wired or a wireless connection.

Figure 2:
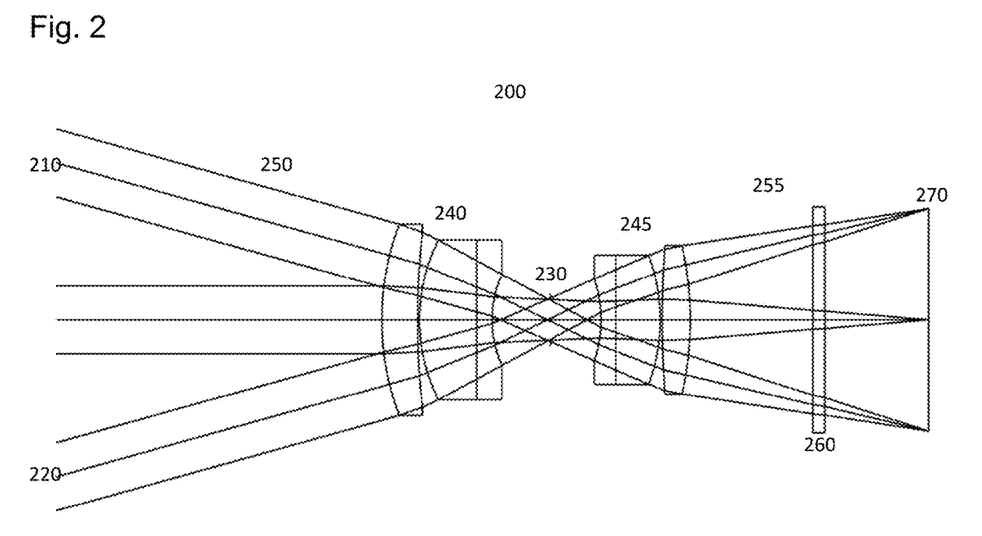
FIG. 2 shows an example optical system including an active light-controlling element.

FIG. 2 shows an example optical system 200 including an active light-controlling element 260 designed according to an embodiment of the present invention. The optical system 200 shown is just an example of an optical system including 6 refractive optical lenses, but the method can be used with any kind of optical system having any number of optical elements, including refractive elements, reflective elements, diffractive elements, elements with meta-surfaces, active optical elements or any other optical element able to change the direction of rays of light in order to help form an image in the image plane of the optical system. In this schematic, the rays of light are considered going from the left to the right until they reach an image plane 270. The optical system 200 has a total field of view defined as the angle between the extreme rays 210 and 220 on the figure. The value of this angle defining the total field of view can be any value according to the present invention, from ultra-narrow field of view to ultra-wide field of view. The optical system has an aperture stop 230 limiting the total amount of light entering the system that will ultimately reach the image plane 270. In this example figure, there is a group of optical elements 240 in front of the aperture stop 230 and a group of optical elements 245 behind the aperture stop, but in other embodiments, the aperture stop could be located in front of all optical elements or behind all optical elements. By definition of the aperture stop, at the surface 230, all rays of light from all the different object fields are passing through the same region and an active light-controlling element cannot have different effect depending on the object position in the field of view.

In the optical system 200, there are regions far from the aperture stop where the rays of light from different object fields are well separated. These regions can be in front of the aperture stop as in the region 250 or behind the aperture stop as in the region 255. These regions where the rays for different fields are well separated do not have to be in front or behind all optical elements according to the present invention and these regions could be located between at least one optical element on each side. In the example of FIG. 2, the active light-controlling element 260 is located in the region with separated fields 255, but the active light-controlling element 260 could be located at any position in the optical path according to the method of the present invention, including near the aperture stop 230 if no different light control is required between the various fields.

In the image of FIG. 2, the active light-controlling element 260 is of plano-plano shape, but this is not always the case, and the active light-controlling element 260 could be of any shape on either side of the element, including convex, concave, plano, spherical, aspherical, conic or any other shape that can be useful according to the optical design of the full optical system. The active light-controlling element can also be a standalone optical element as illustrated in FIG. 2 or part of another existing optical element, like positioned on a surface of another lens element, for example when the active light-controlling element is a thin film that can be coated on another element. The active light-controlling element could also be in the form of a thin-film array in which multiple voltages can be applied to control the transmission. The active light-controlling element is any optical element with one or several sub-elements that can be controlled independently, each sub-element allowing a different amount of light to pass through it depending on the input from the controller. In some embodiments, the active light-controlling element 260 is divided in several sub-elements of electrochromic windows that can control the amount of light transmission for each sub-element by controlling the applied voltage on each sub-element. Each electrochromic window sub-element can be made of any substrate (glass, plastic or other materials) coated with any number and type of layer to produce a least one electrochromic surface. In other embodiments, the at least one active light-controlling element can be made of any other light-controlling material, including, but not limited to, liquid crystals, neutral density filters, plasmonic transparent conductive oxide nanocrystals or other types of nanocrystals or the like. The method also works with any kind of light, polarized or unpolarized, in the visible or in other parts of the electromagnetic spectrum including, but not limited to, the UV or the IR spectrum. How the active light-controlling element 260 is used to improve the imaging performances of the camera will be explained with respect to FIG. 3.

In summary, the example method for controlling an optical system including at least one active light-controlling element having one or more sub-elements includes the following steps. First, the optical system creates a first optical image in an image plane. Then, an image sensor located at or near the image plane converts the first optical image to a first digital image with at least one sub-area requiring a light level adjustment, either as part of a file stored on a device or as part of a memory. Then, a processor analyzes the first digital image to determine a required setting of at least one of the one or more sub-elements of the at least one active light-controlling element to adjust the light level of the at least one sub-area to a desired light level. Then, a controller adjusts the setting of the at least one of the one or more sub-elements of the at least one active light-controlling element. Then, the optical system, and the at least one of the one or more sub-elements of the at least one active light-controlling element at the adjusted setting, creates a second optical image in the image plane. Then, the image sensor converts the second optical image to a second digital image. The processor can then optionally transform, either the same as before or another processor part of the same device or part of another device, the second digital image to a transformed digital image, the transforming including at least reversing a light-controlling effect of the one or more sub-elements of the at least one active light-controlling element. One of the transformed digital image or the second digital image can then also optionally be output to a display device or to a further algorithm unit.

In addition to the method, embodiments of the present invention also include an imaging device including the following. First, the imaging device includes an optical system having at least one active light-controlling element having one or more sub-elements, the optical system being configured to create, in an image plane, a first optical image. Second, the imaging device includes an image sensor, located near the image plane, and is configured to convert the first optical image to a first digital image with at least one sub-area requiring a light level adjustment. Third, the imaging device includes a processor configured to analyze the first digital image to determine a required setting of at least one of the one or more sub-elements of the at least one active light-controlling element to adjust the light level of the at least one sub-area to a desired level. Fourth, the imaging device includes a controller configured to adjust the setting of the at least one of the one or more sub-elements of the at least one active light-controlling element. In this imaging device, the optical system is further configured to create a second optical image in the image plane after adjustment of the setting of the at least one of the one or more sub-elements by the controller and the image sensor is further configured to convert the second optical image to a second digital image. The imaging device has all the same capabilities as described in the method for controlling an optical system.

Figure 3:
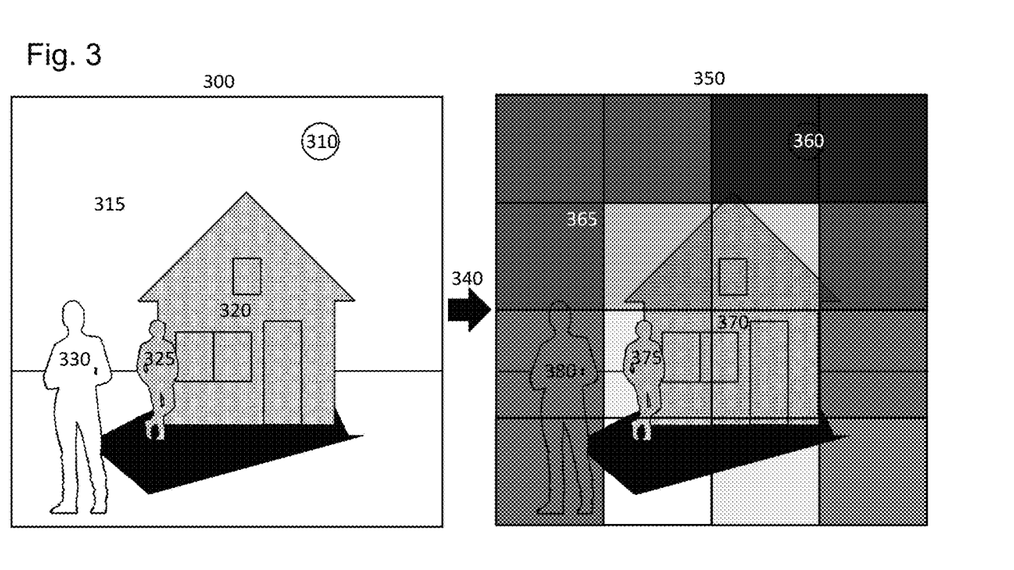
FIG. 3 shows an example image transformation by a 4×4 square active light-controlling element.

FIG. 3 shows an example image transformation by a 4×4 square active light-controlling element. The use of a 4×4 square grid of sub-elements is just an example to better explain the concept, but any shape or number of sub-elements could be used as will be explained in more details at FIG. 7. The figure compares the resulting image captured and outputted from the image sensor without using an active light-controlling element at 300 and after the action 340 by the controller of turning on the active light-controlling element at 350. In the case 300 without using the active light-controlling element, all the light from the scene reaches the sensor according to the properties of the optical system without any difference based on the actual scene content. In this case, the Sun 310, the sky around it 315 and the person 330 are over-exposed and details are lost. Over-exposure happens because the electronic image sensors have a minimum and a maximum value of the electric signal they can receive per pixel during an exposure-reading cycle and when more light is received after the maximum is reached, the additional electric signal is lost. On the image, over-exposure appears as a region of the image all of the same color and without any difference in details and is not desirable. For the application according to the present application, the over-exposure could be defined as when the amount of light on a pixel reaches the absolute maximum value for that pixel or by a custom pre-defined threshold value close to that absolute maximum value allowed by the pixel. As for the side of the house 320 and the person standing in the shadow 325, they are in a darker part of the image and can be under-exposed, meaning that details are also hard to see. Compared to existing HDR technologies that take multiples images to compensate this undesirable effect and combine them at the software processing level, when the controller activates the active light-controlling element at step 240, the new image 350 is created from the optical system on the image sensor and outputted to the processor.

To get the desired light level for each sub-element, the processor analyzes previous frames from the sensor as will be explained in FIG. 5. In the image 350 with at least one sub-area of the image with adjusted light levels, the brightest part of the image like the Sun 360, the sky 365 or the person standing 380 have been applied with different levels of darker sub-elements of the active light-controlling element. The darkest part of the scene like the side of the house 370 or the person 375 have been applied with different levels of lighter sub-elements of the active light-controlling element. The resulting image 350 with at least one sub-area of the image with adjusted light levels is captured by the image sensor of the camera and can be further processed into a final image with higher depth as will be explained at FIG. 6. In some embodiments, the controller can adjust the setting or transmission value of at least one of the one or more sub-elements inside a range based on a setting or a transmission value of at least one neighboring sub-element in the at least one active light-controlling element in order to limit the change of transmission from one sub-element to the other under a maximum threshold value. This is done to avoid too large a change in the digital image file from the image sensor and allow for a more continuous final image after processing to get the final image with higher depth. In some other embodiments, the controller adjusts the setting of the at least one of the one or more sub-elements to compensate for a drop of relative illumination of the optical system.

Figure 4:
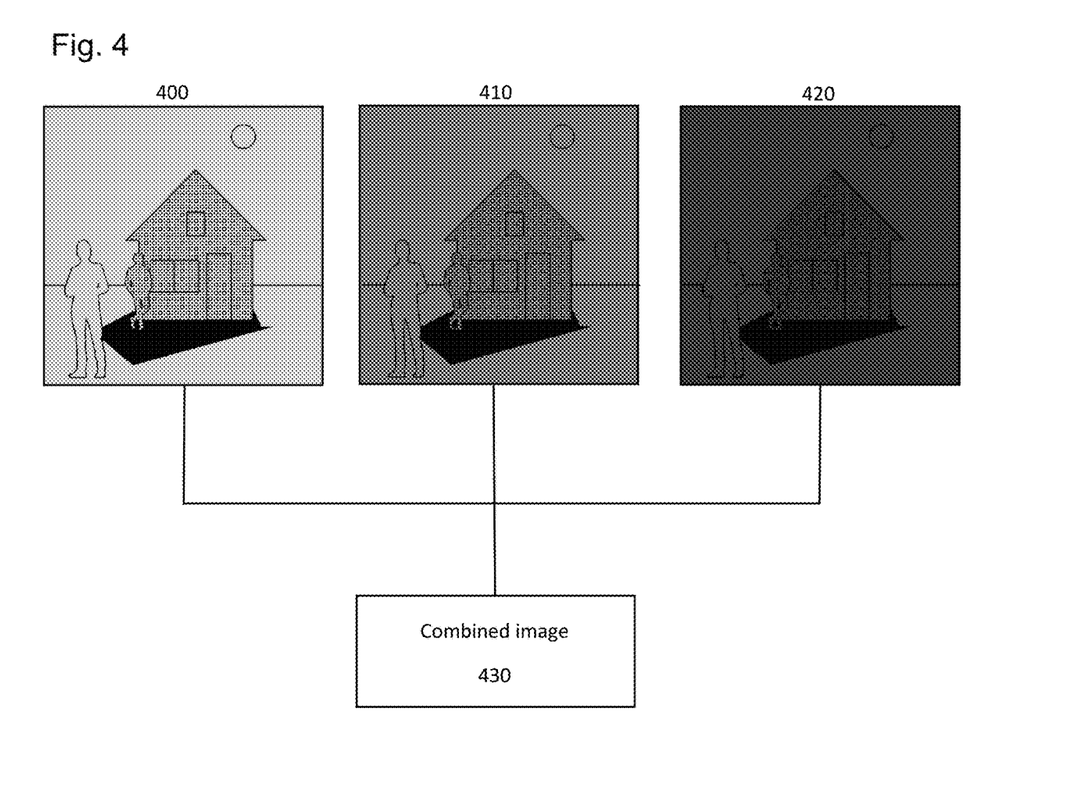
FIG. 4 shows an example where the active light-controlling element is used to obtain better HDR images than traditional methods.

FIG. 4 shows an example where the active light-controlling element is used to obtain better HDR images than traditional methods. Standard HDR techniques combine multiple images of a scene with different brightness levels in order to obtain a processed image with the details from each image that would have been impossible to reach with a single exposure. In traditional HDR systems, the different images are captured either by adjusting the exposure time, the aperture size or the gain from the sensor. However, using different exposure time is not ideal in a dynamic scene in which a different exposure time between images could create artifacts. Adjusting the aperture to create images of different brightness also affects the image quality and the depth of focus and is not ideal. Using the image sensor gain also has its drawbacks since the higher gain needed for the brighter image amplifies the noise in the image. Using an active light control element, multiple images of different brightness can be obtained with a constant exposure time, aperture size and image sensor gain, avoiding the previously mentioned issues.

In FIG. 4, the captured image 400 has a high brightness, the captured image 410 has a medium brightness and the captured image 420 has a low brightness. All three images are obtained from the same scene with the same exposure time, aperture size and gain, the difference being controlled from using different settings of the active light control element. In this example, an embodiment of the method according to the present invention is used to create only one sub-area in the optical image using only one sub-element in the active light-controlling element. As such, there is also only one sub-area in the digital images after conversion by the image sensor. The same light control level is applied to the whole image, without any difference for various sub-elements as in the previous FIG. 3, in order to use the resulting images with existing HDR merging algorithms. The result is a merged HDR image 430 with improved level of details without the drawbacks of traditional HDR techniques.

Figure 5:
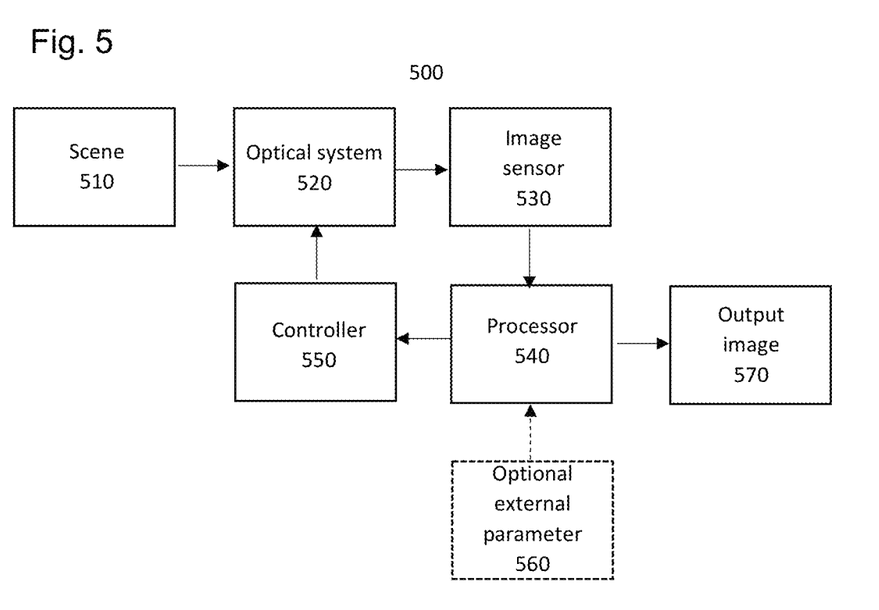
FIG. 5 shows an example of a feedback loop to use the image from the image sensor to control the active light-controlling element.

FIG. 5 shows an example of a feedback loop to use the image from the image sensor to control the active light-controlling element inside the full imaging device in one embodiment according to the present invention. In this feedback loop, the object scene 510 is imaged by the optical system 520 having at least one active light-controlling element. The optical system creates a first optical image on the image sensor 530 which transform it into a first digital image. The first digital image is sent to the processor 540 that can execute any kind of analyses in order to determine the required level of transmission for each sub-element of the active light-controlling element. This analysis could include, without being restricted to, some automatic analysis by an artificial intelligence algorithm that automatically detects the over-exposed and under-exposed zones of the images and adapts the controller parameters accordingly. In some embodiments, the processor 540 can also receive at least one optional external parameter 560 from any source, including from a user selection, from another device, from another sensor or the like. This external parameter could be something like a zone of interest in the image, weather or Sun illumination information or forecast, distance information from objects, material of an object, reflectance of an object, light spectrum lighting the object or any other parameter. This at least one external parameter is used by the processor when analyzing the first digital image and can affect the analyses from the processor and thus affect the required transmission for some or all of the sub-elements of the active light-controlling surface. If improvement to the output image can still be gained from changing the transmission of at least one sub-element, the processor 540 sends the required level of transmission for each sub-element to the controller 550.

The controller 550 is any hardware that can adjust the light transmission settings of at least one sub-element by applying the required changes to at least one sub-element of at least one active light-controlling element. The controller could be, as an example in no way limiting the scope of the current invention, a device that can apply different voltages or current to each of the sub-elements in order to change their light transmission. The controller could also be a device physically moving some sub-elements of the active light-controlling element, like mechanical actuators or the like. Inside the imaging device, there could be a single controller to control all the active light-controlling element sub-elements or multiple separated controllers that each control some of the sub-elements.

The optical system and the at least one of the one or more sub-elements of the at least one active light-controlling element at the adjusted setting create a second optical image in the image plane and the image sensor converts the second optical image to a second digital image. In some embodiments according to the present invention, the controller can change the light transmission levels by adjusting the settings of the at least one of the one or more sub-elements using a machine-learning based algorithm, for example either to maximize a key performance indicator (KPI) or to minimize a lost function to get the best captured image. The processor 540 also outputs the second digital image as the final image 570, either at each loop of the feedback loop or only when no more improvement to the image can be achieved depending on the application. Further processing of the second digital image can be done either by the processor 540 before outputting the final image or by another device having a processor and receiving the output image 570 as will be explained in FIG. 6.

Figure 6:
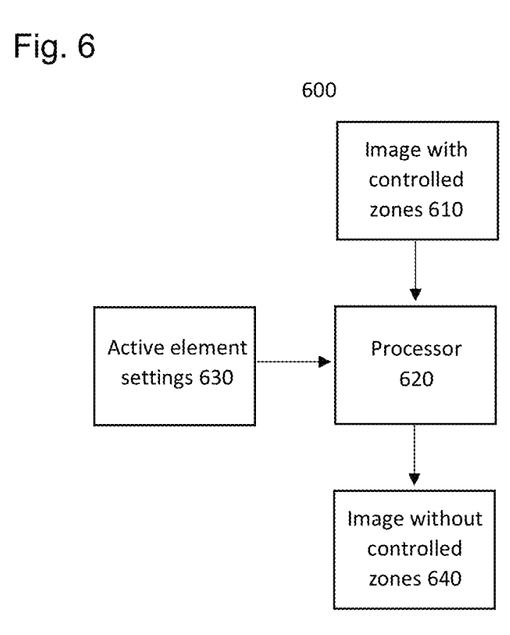
FIG. 6 shows the steps for transforming a digital image with controlled light zones to a processed image without controlled light zones.

FIG. 6 shows the steps for transforming a digital image with at least one sub-area with controlled light to a processed image without controlled light areas. These optional steps can be used when the output second digital image needs to be processed back to a normal image for example when the application requires to show the image to a human observer. A second digital image with zones of controlled light 610 as schematized at 350 of FIG. 3 is outputted from an image sensor of a camera after applying the method for controlling the optical system described before. This second digital image is often of lower depth, meaning that for each color channel, the light level for each pixel is represented by a lower number of bits. In digital imaging, the depth of an image is the total number of different values of brightness that can be uniquely identified. When multiple color channels are present, they each have a depth. For a single channel, the depth is sometime represented for example by either 8 bits, 10 bits or 12 bits, meaning respectively 256 different values, 1024 different values or 4096 different values of brightness for a channel. When increasing the number of bits, for example from 8 bits to 12 bits, we say that we increase the depth of the image, going from a lower depth to a higher depth.

The second digital image with zones of controlled light 610 is inputted in a processor 620. The processor 620 is any device able to execute hardware or software algorithms to transform the image, including a CPU, a GPU, an ASIC, a FPGA or any other device able to transform the image. In some embodiments, the processor is used to execute artificial intelligence algorithms to process the image, including any algorithms trained via deep learning techniques. The processor 620 receives and uses the settings from the at least one active light-controlling element 630, including the level of transmission of each sub-element, to transform the second digital image. The processor 620 then combines the second digital image 610 and the settings 630 into a transformed image without zones of controlled light 640 by reversing the precisely known effect of the active light-controlling element for each sub-element. By directly sending the active element settings 630 to the processor 620, the processor can adaptively tune the post-processing operation in order to have a constant image quality level at the end. Additional smoothing algorithms can be used at this step to uniformize the light level of the processed image and avoid any visible remaining transition in the processed image, either from imperfects settings or from transition zones between the sub-elements. The transformed image without zones of controlled light 640 is generally a higher depth image than the original image 610, meaning that for each color channel, the light level for each pixel is represented by a higher number of bits. In some embodiments according to the present invention, the processing to transform the digital image with controlled light zones to a processed image without controlled light zones can have processing by zones smaller than the size of the sub-elements as imaged on the image sensor. For example, even if the sub-elements of the active light-controlling element are represented by a 4×4 square grid, the processing zones could consist of a 16×16 square grid of smaller zones than the ones created by the sub-elements. This could be done in part to help the processing to create smoother final images without any visible borders between the sub-elements, especially when the effect of the sub-elements on the image sensor is not a clear-cut transition but a progressive one. In some other embodiments according to the present invention, the method could use the information from the video flux by using the luminosity information from previous frames that were captured with different settings of the active-light-controlling element in order to improve the processing.

Figure 7:
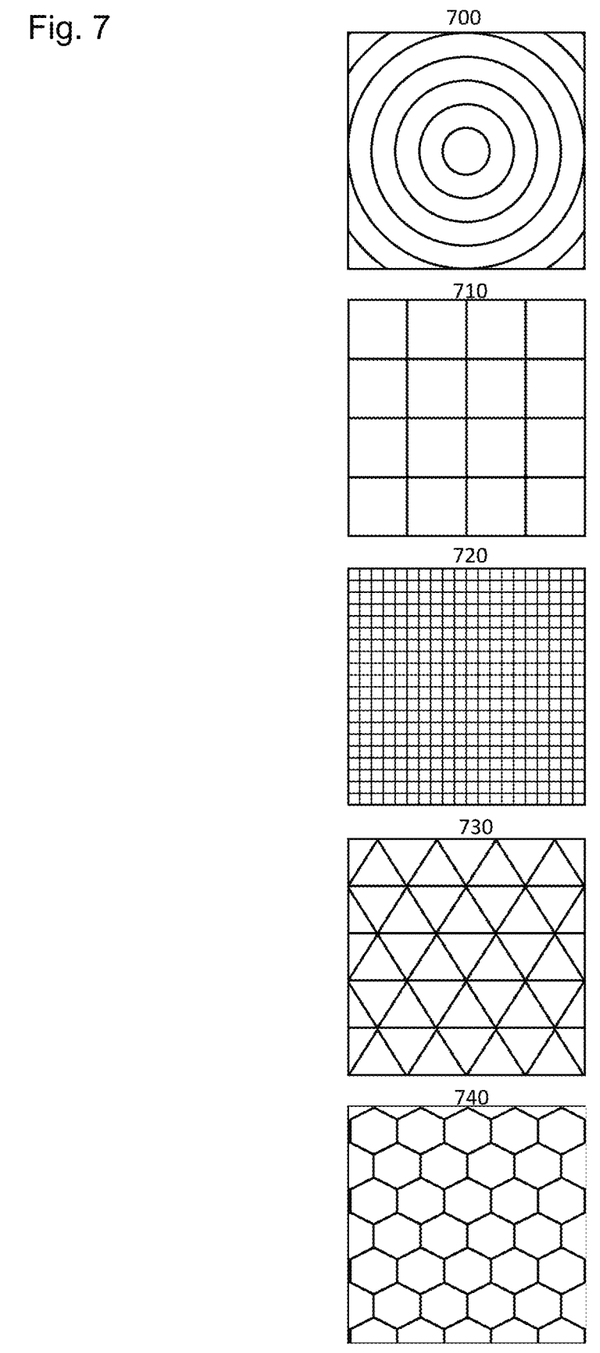
FIG. 7 shows five examples of different shapes for the sub-elements of the active light-controlling element.

FIG. 7 shows five examples of different possible shapes for the sub-elements of the active light-controlling element. These examples are shown for better clarity and the number or shapes of the sub-elements are in no way limiting the scope of the present invention. The first example 400 is circular concentric grid of sub-elements, especially useful when the scene has some symmetry around the optical axis. In other embodiments, the active light-controlling element with concentric circular sub-elements can be used to compensate, at least in part, for a drop of relative illumination that comes naturally in wide-angle optical systems. This type of active light-controlling element with sub-elements having rotational symmetry can be used at any location of the optical system, including exactly at the aperture stop, near the aperture stop or far from the aperture stop. In some other embodiments, this type of symmetrical light-controlling element can be passive instead of active, its properties being fixed at the lens design stage. In some other embodiments, this type of symmetrical light-controlling is located at the aperture stop of the optical system and its transmission and reflection properties are dependent on the angle of incidence of the rays of light on the light-controlling element, meaning that depending on the angle of incidence, the light-controlling surface can let more or less rays of light pass through it. This can be used for example to compensate, at least in part, for a natural drop of relative illumination like the one often seen with increasing field of view in wide-angle optical systems.

The second example 710 is a grid with a small number of square or rectangular sub-elements like 4×4 in this figure, similar to that shown in FIG. 3. The third example 720 is a grid with a large number of square or rectangular sub-elements and is especially useful when a more precise control of the scene is required. This third example with a large number of sub-elements could also represent the extreme case in which each imaging pixel of the image sensor has its light controlled by its own sub-element of the active light-controlling element. The fourth example 730 is a mesh made of triangular sub-elements. One example of use is when the sub-elements need to not be aligned with the pixels of the image sensor in order to avoid creating long lines of artifacts missing information on the image sensor if the space between the sub-elements is large. The fifth example 740 is a hexagonal mesh grid of sub-elements and is an alternate way to divide the surface. While the examples of FIG. 7 have symmetrical sub-elements, this is not required according to the present invention and the sub-element patterns could be different depending on their location, including irregular or aperiodic patterns of sub-elements.

Figure 8:
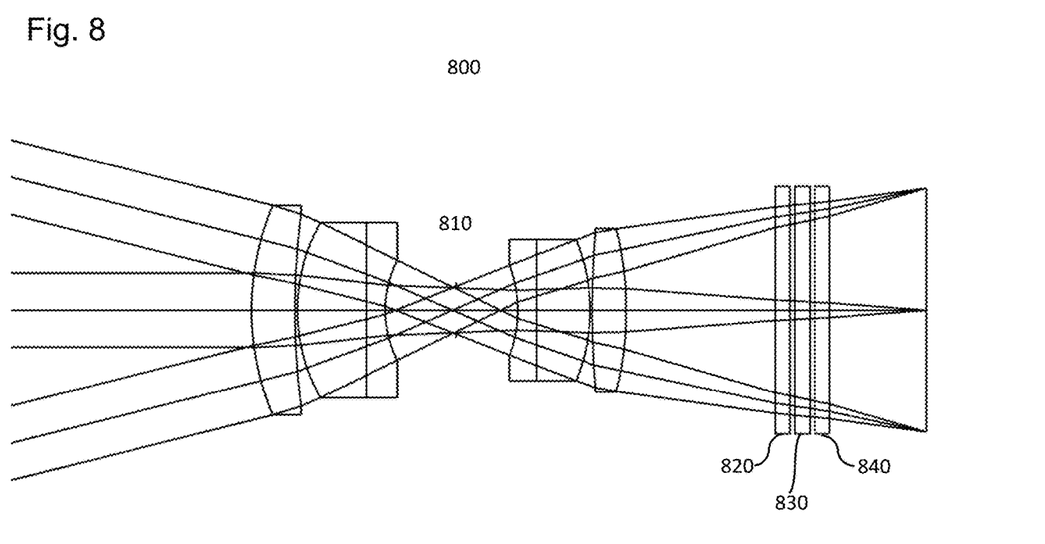
FIG. 8 shows an example optical system including multiple active light-controlling elements to separate different colors on the image sensor.

FIG. 8 shows an example optical system including multiple active light-controlling elements to adjust different colors independently, including to separate different colors on the image sensor. As in FIG. 2, the optical system 800 is just an example optical system having 6 refractive optical lenses, but the method according to the present invention can be used with any kind of optical system having any number of optical elements, including refractive elements, reflective elements, diffractive elements, elements with meta-surfaces, active optical elements or any other optical element able to change the direction of rays of light in order to help form an image in the image plane of the optical system. The optical system 800 includes multiples active light-controlling elements or surfaces, shown here in this example as the three elements 820, 830 and 840, in combination with other optical elements 810. The exact number or positions of the multiple active light-controlling elements or surfaces can be anything according to the present invention and are not limited to this example figure. In this example figure, the first active light-controlling element 820 has a blue filtering surface that always transmits a part of the electromagnetic spectrum around the blue color (controllable or not) and can transmit a custom level of light outside of the blue region depending on the controller setting. The second active light-controlling element 830 has a green filtering surface that always transmits a part of the electromagnetic spectrum around the green color (controllable or not) and can transmit a custom level of light outside of the green region depending on the controller setting. The third active light-controlling element 840 has a red filtering surface that always transmits a part of the electromagnetic spectrum around the red color (controllable or not) and can transmit a custom level of light outside of the red region depending on the controller setting. Together, the three active light-controlling elements 820, 830 and 840 in this example can create images on the image sensor with selected levels of blue, green or red without the need of using multiple image sensors. The three images can then be recombined together into a processed image with all the selected colors, allowing a better control of chromatic aberrations naturally present in the images like lateral color. In other embodiments, the exact color transmitted and filtered by each of the active light-controlling element can be from any part of the electromagnetic spectrum and is not limited to visible light.

In some other embodiments, these optical systems having at least one active light-controlling element can be used in a multi-imaging configuration, including stereoscopic vision, back-to-back vision, or any other configuration using more than one imaging camera. In that case, when a part of the scene is imaged by more than one camera, the at least one processor or the at least one controller can share information from the scene captured from multiple cameras in order to improve the image processing when a scene is captured with more than one kind of illumination at the same time.

In some other embodiments, the controller can vary the light transmission level by adjusting the settings of the at least one of the one or more sub-elements of the active light-controlling element using pre-defined or even random values in order to quickly sample the scene with a high dynamic range. This can then be used in combination with a traditional or a machine-learning based algorithm to determine the best transmission level of each sub-element to capture the best image possible.

In some other embodiments, the light-controlling optical element or at least one of the one or more sub-elements can include some optical surface than can transmit light up to a defined light threshold and that can automatically and passively reflect some light when above that light quantity threshold. Some active control can also be used on this element to control that threshold level as desired. In this embodiment, the light above the threshold could be reflected toward any other optical sensor to record the information in this amount of light above the threshold level.

In some other embodiments, the active light-controlling element can be used in collaboration with a light field optical system (also known as a plenoptic optical system) using at least one grid of micro-lens element to create multiple light field images. In these embodiments, the optical system is a light field optical system. The active light-controlling element could be used to turn on or off some micro-lenses as desired for the application, including to avoid overlap of micro images on the image sensor. The active light-controlling element could also be made of the micro-lens array itself, in which each micro-lens can be activated or disabled, partially or fully, as desired.

All of the above figures and examples show the method to improve the image quality and brightness of a digital image by controlling the incoming light on the image sensor using at least one active light-controlling element. These examples are not intended to be an exhaustive list or to limit the scope and spirit of the present invention. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for controlling an optical system comprising at least one active light-controlling element having one or more sub-elements, the method comprising:
   a. creating, with the optical system, a first optical image in an image plane;
   b. converting, with an image sensor located near the image plane, the first optical image to a first digital image with at least one sub-area requiring a light level adjustment;
   c. analyzing, with a processor, the first digital image to determine a required light transmission level setting of at least one of the one or more sub-elements of the at least one active light-controlling element to adjust the light level of the at least one sub-area to a desired light level;
   d. adjusting, with a controller, the light transmission level setting of the at least one of the one or more sub-elements of the at least one active light-controlling element;
   e. creating, with the optical system and the at least one of the one or more sub-elements of the at least one active light-controlling element at the adjusted light transmission level setting, a second optical image in the image plane; and
   f. converting, with the image sensor, the second optical image to a second digital image.

2. The method of claim 1, further comprising the step of:
   g. transforming, with the processor, the second digital image to a transformed digital image, the transforming including at least reversing a light-controlling effect of the one or more sub-elements of the at least one active light-controlling element.

3. The method of claim 2, wherein the processor uses light transmission level settings from the at least one active light-controlling element to transform the second digital image.

4. The method of claim 2, further comprising:
   h. outputting, to a display, one of the transformed digital image or the second digital image.

5. The method of claim 1, wherein the at least one active light-controlling element includes at least one of an electrochromic surface, a liquid crystal, a neutral density filter or plasmonic transparent conductive oxide nanocrystals.

6. The method of claim 1, wherein the processor receives at least one external parameter and uses the at least one external parameter when analyzing the first digital image.

7. The method of claim 1, wherein the controller adjusts the light transmission level setting of the at least one of the one or more sub-elements based on a light transmission level setting of at least one neighboring sub-element in the at least one active light-controlling element.

8. The method of claim 1, wherein there is only one sub-area in the first digital image.

9. The method of claim 1, wherein the controller adjusts the light transmission level setting of the at least one of the one or more sub-elements using a machine-learning based algorithm.

10. The method of claim 1, wherein the controller adjusts the light transmission level setting of the at least one of the one or more sub-elements to compensate for a drop of relative illumination.

11. The method of claim 1, wherein the optical system includes multiple active light-controlling elements to adjust different colors independently.

12. The method of claim 1, wherein the controller adjusts the light transmission level setting of the at least one of the one or more sub-elements using pre-defined or random values.

13. The method of claim 1, wherein the one or more sub-elements can transmit light up to a defined light threshold.

14. The method of claim 1, wherein the optical system is a light field optical system.

15. An imaging device comprising:
   a. an optical system comprising at least one active light-controlling element having one or more sub-elements, the optical system being configured to create, in an image plane, a first optical image;
   b. an image sensor, located near the image plane, and configured to convert the first optical image to a first digital image with at least one sub-area requiring a light level adjustment;
   c. a processor configured to analyze the first digital image to determine a required light transmission level setting of at least one of the one or more sub-elements of the at least one active light-controlling element to adjust the light level of the at least one sub-area to a desired level; and
   d. a controller configured to adjust the light transmission level setting of the at least one of the one or more sub-elements of the at least one active light-controlling element the optical system being further configured to create a second optical image in the image plane after adjustment of the light transmission level setting of the at least one of the one or more sub-elements by the controller, and the image sensor being further configured to convert the second optical image to a second digital image.

16. The imaging device of claim 15, wherein the processor is further configured to transform the second digital image to a transformed digital image, the transforming including at least reversing a light-controlling effect of the one or more sub-elements of the at least one active light-controlling element.

17. The imaging device of claim 16, further comprising:
   e. a display configured to output one of the transformed digital image or the second digital image.

18. The imaging device of claim 15, wherein the processor receives at least one external parameter and is configured to use the at least one external parameter when analyzing the first digital image.

19. The imaging device of claim 15, wherein there is only one sub-area in the first digital image.

20. The imaging device of claim 15, wherein the controller is configured to adjust the light transmission level setting of the at least one sub-element to compensate for a drop of relative illumination.

* * * * *